United States Patent
Sanche

(10) Patent No.: US 10,673,909 B2
(45) Date of Patent: Jun. 2, 2020

(54) FRAMEWORK TO NOTIFY AND INVITE USERS TO JOIN A COLLABORATIVE SESSION

(71) Applicant: Calgary Scientific Inc., Calgary (CA)

(72) Inventor: Neal Andrew Sanche, Calgary (CA)

(73) Assignee: CALGARY SCIENTIFIC INC., Calgary (CA)

( * ) Notice: Subject to any disclaimer, the term of this patent is extended or adjusted under 35 U.S.C. 154(b) by 0 days.

(21) Appl. No.: 16/000,987

(22) Filed: Jun. 6, 2018

(65) Prior Publication Data

US 2019/0141092 A1    May 9, 2019

Related U.S. Application Data

(63) Continuation of application No. 14/078,194, filed on Nov. 12, 2013, now abandoned.

(60) Provisional application No. 61/725,381, filed on Nov. 12, 2012.

(51) Int. Cl.
G06F 15/16    (2006.01)
H04L 29/06    (2006.01)
H04L 29/08    (2006.01)

(52) U.S. Cl.
CPC ...... *H04L 65/1073* (2013.01); *H04L 65/1069* (2013.01); *H04L 65/4015* (2013.01); *H04L 67/26* (2013.01); *H04L 67/141* (2013.01); *H04L 67/24* (2013.01)

(58) Field of Classification Search
CPC . H04L 65/1073; H04L 65/1069; H04L 67/26; H04L 67/141

USPC .......................... 709/204–206, 228
See application file for complete search history.

(56) References Cited

U.S. PATENT DOCUMENTS

| | | | |
|---|---|---|---|
| 7,379,963 B1 | 5/2008 | Khare et al. | |
| 7,917,394 B2* | 3/2011 | Borelli | G06Q 30/04 705/26.1 |
| 8,341,207 B2 | 12/2012 | Werner et al. | |
| 8,407,776 B2 | 3/2013 | Somani et al. | |
| 8,412,833 B2 | 4/2013 | Vyrros et al. | |

(Continued)

OTHER PUBLICATIONS

"Calgary Scientific Revolutionizes Application Sharing and Advanced Collaboration with PureWeb 3.0," Press Release, retrieved from the internet at http://cnw.ca/iUlgg, 2011, 2 pages.

(Continued)

*Primary Examiner* — David R Lazaro
*Assistant Examiner* — Mariegeorges A Henry
(74) *Attorney, Agent, or Firm* — Meunier Carlin & Curfman LLC

(57) ABSTRACT

A notification framework and method that quickly sends invitations one device to another device to join devices to collaboration session. Devices may be provided with an application that enables a user to register with a registry service. The registry service is provided as a mechanism to enable delivery of a collaboration invitation and joining of participants in the collaborative session. Notification invitations containing a collaboration URL may then be forwarded via a push service to the invited registrants. Each invited registrant is then provided an option to accept invitation and automatically join the session with the user. In another example, the host user may "pass" or "share" a session to an invited registrant rather than having an invited registrant join a session.

19 Claims, 21 Drawing Sheets

(56) References Cited

U.S. PATENT DOCUMENTS

| | | |
|---|---|---|
| 8,423,058 B2 * | 4/2013 | Mathias .............. H04M 7/0057 |
| | | 455/466 |
| 8,521,809 B2 | 8/2013 | Arnold et al. |
| 8,935,334 B2 | 1/2015 | Hon |
| 2002/0076025 A1 | 6/2002 | Leversidge et al. |
| 2005/0210114 A1 | 9/2005 | Washburn |
| 2006/0053380 A1 | 3/2006 | Spataro et al. |
| 2006/0079260 A1 | 4/2006 | Tillet et al. |
| 2008/0028323 A1 * | 1/2008 | Rosen ..................... G06Q 10/10 |
| | | 715/752 |
| 2009/0098853 A1 | 4/2009 | Mutikainen et al. |
| 2009/0132653 A1 * | 5/2009 | Niazi ..................... G06Q 10/00 |
| | | 709/204 |
| 2010/0131591 A1 | 5/2010 | Thomas et al. |
| 2010/0325710 A1 | 12/2010 | Etchegoyen |
| 2011/0238766 A1 | 9/2011 | Lew et al. |
| 2011/0252144 A1 | 10/2011 | Tung et al. |
| 2011/0313258 A1 | 12/2011 | Chopra et al. |
| 2012/0158517 A1 | 6/2012 | Rathod |
| 2012/0185291 A1 | 7/2012 | Ramaswamy et al. |
| 2012/0311046 A1 | 12/2012 | Grigoriev |
| 2013/0144974 A1 | 6/2013 | Haakenson et al. |
| 2014/0123033 A1 | 5/2014 | Uhma et al. |
| 2015/0372984 A1 * | 12/2015 | Kacmarcik ......... H04L 63/0428 |
| | | 726/22 |

OTHER PUBLICATIONS

Search Report, dated Sep. 16, 2016, received in connection with European Patent Application No. 13855822.6.

\* cited by examiner

FRAMEWORK TO NOTIFY AND INVITE USERS TO JOIN A COLLABORATIVE SESSION

CROSS-REFERENCE TO RELATED APPLICATION

This application is a continuation of U.S. patent application Ser. No. 14/078,194, filed Nov. 12, 2013, entitled "FRAMEWORK TO NOTIFY AND INVITE USERS TO JOIN A COLLABORATIVE SESSION" which claims priority to U.S. Provisional Patent Application No. 61/725,381, filed Nov. 12, 2012, entitled "ARCHITECTURE HAVING INVITATION MECHANISM TO PROVIDE NOTIFICATIONS TO JOIN A COLLABORATIVE SESSION," which is incorporated herein by reference in its entirety.

BACKGROUND

Certain environments may provide for collaboration among users of applications and data. For example, some Picture Archiving and Communication Systems (PACS) may provide remote access to the patient studies. In those systems the sending of invitations to join participants to a collaborative session to view data associated with an application is often accomplished by copying links and emailing them to other participants. This is cumbersome and may create security concerns if the links are misdirected to unintended recipients.

SUMMARY

Disclosed herein are systems and methods for providing invitations to devices to join a collaborative session using a notification framework. The notification framework includes a registry service that receives user registration information and an invitation request from a host to join at least one registered user to a session, and a database that stores the user registration information and the invitation request. The registry service communicates the invitation to a push service that provides for a push notification of the invitation request to a user device associated with the at least one registered user, and the framework is adapted to initiate collaborative sessions between the host and the at least one other registered user on-the-fly.

In accordance with another aspect, there is provided a method of initiating a session between a host and at least one registered user using a notification framework. The method may include receiving an indication from the host to begin a session; populating a user interface with at least one other registered user to join the session, the at least one other registered user being retrieved by a registration service from a database of registered users; inviting the at least one other registered user to join the session through a notification process that pushes an invitation request to a computing device associated with the at least one other registered user; and joining the at least one other registered user to the session in response to an acceptance of the invitation from the at least one other registered user.

In accordance with yet another aspect, there is provided a method of administering a workflow in a notification framework. The method includes registering users with a registration service of the notification framework, each of the users having a user account; associating at least one user device with each user account; applying rules in response to a notification request from a host to invite a second user to join a session; in response to the rules, forwarding the notification to the second user; and joining the second user to the session upon receipt of an acknowledgement of the notification from the second user.

In the above, the session may be a collaborative session or an application sharing session.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Overview

In accordance with aspects of the present disclosure, client devices may be provided with an application that enables a user to register with a registry service within a notification framework. The registry service is provided as a mechanism to enable delivery of a collaboration invitation and joining of participants in the collaborative session. For example, a list of registrants may be displayed to a host user on, e.g., a mobile device display. The host user may select one or more registrants to join in the session from the list. Invitations may then be forwarded via a push service to the invited registrants. Each invited registrant is then provided an option to accept invitation and automatically join the session with the user. Thus, the present disclosure provides for a mechanism to enable users to quickly, easily and securely invite participants to collaborate in a session. In another example, the host user may "pass" or "share" a session to an invited registrant rather than having an invited registrant join a session. Using a sharing operation, the session is passed to the invited registrant, the host user is no longer part of the session and the invited registrant takes over as host.

Example Framework

Figure 1:
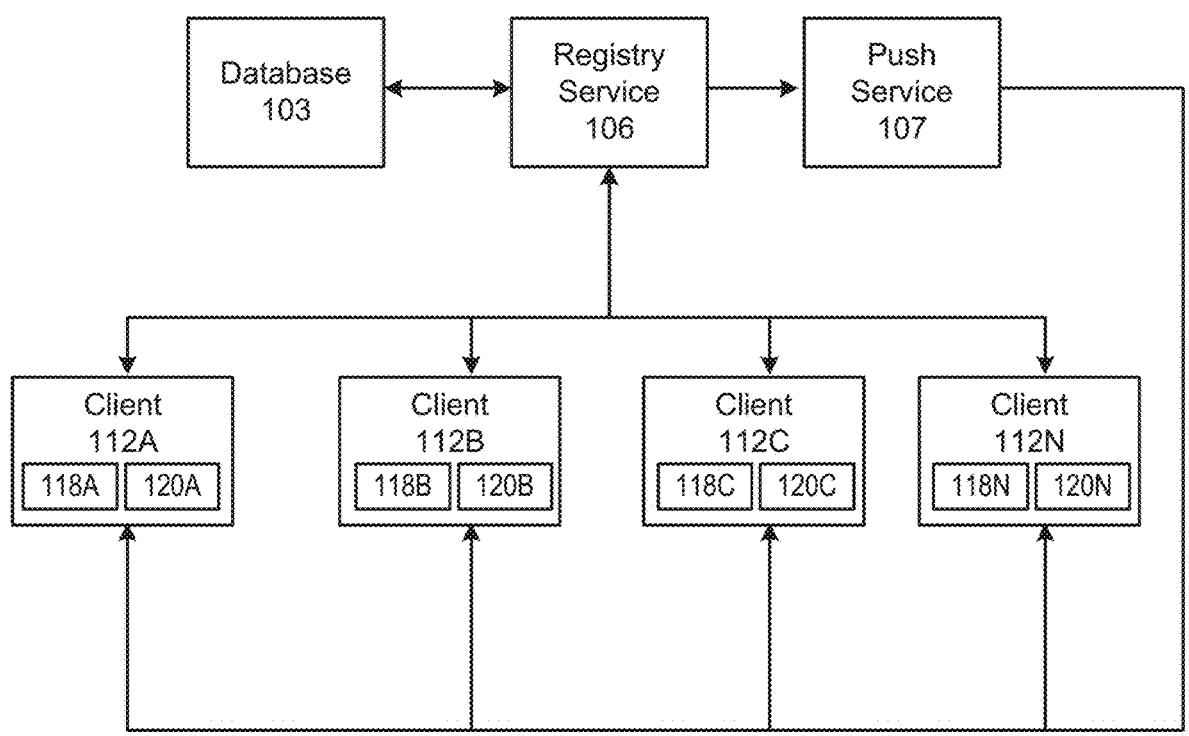
FIG. 1 is a simplified block diagram illustrating a notification framework.

With the above overview as an introduction, reference is now made to FIG. 1 where there is illustrated a notification framework 100 that, e.g., quickly sends URLs from one device to another device, such as from one mobile device to another. There are many possible non-limited uses of such a framework, such as sharing web links to another person, or setting up a collaboration session between people. The framework 100 enables one device to send an invitation that contains URL(s) to another device. In addition, the framework 100 may share other types of information other than URLs, such as messages, documents, pictures, multimedia data, etc. The information may include information that is maintained in a database for each user of the framework, such as a Skype ID, Google Voice (or other communication ID). In some implementations, the invitations may be encrypted by the devices, providing zero knowledge on the server.

Within the framework 100, there may be include a database 103, a registry service 106 and a push service 107. Generally, the framework 100 provides registration, notification and invitation services in order to initiate collaborative sessions between users on-the-fly, e.g. a user is automatically and dynamically joined upon acceptance of the invitation. The framework 100 does not require a statically predefined relationship between the users. An example of the services provided by the framework 100 is OnCall, available from Calgary Scientific, Inc., Calgary, Alberta, Canada. The registry service 106 is provided to enable users to register as an available participant to collaboration or application sharing sessions within the framework 100 and to expose the users' availability to others. The database service 103 is provided to store user information, invitation, and other documents associate with the framework 100. The user information may include, but is not limited to, the user's email address, full name, a user computing device identifier, contact information, etc. The push service 107 provides for push notifications of invitations from the registry service 106 to available users to join collaborative sessions. The push service 107 may be used by the registry service 106 to propagate information to client computing devices 112A, 112B, 112C, 112N communicatively connected to the framework 100.

The client computing devices 112A or 112B may be wireless handheld devices such as, for example, a smartphone such as an IOS-based IPHONE 112A or an ANDROID-based device 112B connected via a computer network such as, for example, the Internet, to the registry service 106 and the push service 107. Similarly, the client computing devices may also include a desktop/notebook personal computer 112C or a tablet device 112N that are connected by the communication network to the registry service 106 and the push service 107. It is noted that the connections to the communication network may be any type of connection, for example, Wi-Fi (IEEE 802.11x), WiMax (IEEE 802.16), Ethernet, 3G, 4G, etc. Further, the database 103, registry service 106 and push service 107 may be executed on a general purpose computing device, such as that shown in FIG. 18. The database 103, registry service 106 and push service 107 may be executed on a same or different computing device.

The client computing devices 112A, 112B, 112C, 112N may execute a client application 120A, 120B, 120C, 120N, such as a web browser, to enable a user to display data, for example, in a graphical display with touch-screen. The client application 120A, 120B, 120C, 120N may also provide for collaboration of an application among the client computing devices 112A, 112B, 112C, 112N.

In accordance with aspects of the present disclosure, a notification application 118A, 118B, 118C, 118N cooperates with the registry service 106, which acts a server to the notification application 118A, 118B, 118C, 118N. The notification application 118A, 118B, 118C, 118N may enable a user to register with the registry service 106 to indicate the user's availability to participate in a collaborative session. The notification application 118A, 118B, 118C, 118N may also listen for notifications of invitations to join collaborative sessions.

On desktop client computing devices, a user may send invitations to other users through a web browser running an HTML5 application (a web client). A JavaScript library may be downloaded from the registry service 106 and used to communicate to the framework components (e.g., the registry service 106). The JavaScript library can be included in any web application. Push notifications may be provided to web applications by the push service 107, described below. An example of the push service 107 for web clients is pusher.com, which hosted API for that may be used to provide notifications to connected clients.

On mobile devices such as Android and iOS devices, a user may register to be available by opening a native "OnCall" client application (i.e., the notification application 118A, 118B, 118C, 118N) and registering with the registry service 106. The client applications may send device registrations to the registry service 106 so that they can receive platform specific push notifications. In the case of Android devices, Google Cloud Messaging may be used. In the case of Apple devices, the Apple Push Notification service may be used. In some implementations, the notification application may perform encryption of important parts of message, so that the data is protected when stored in the database 103.

Users of the client computing devices 112A, 112B, 112C, 112N may register with the registry service 106 using an application programming interface (API) exposed by the registry service 106. The API allows a user to register their device type and device identification with the registry service 106. For example, a user may register one or more of client computing devices 112A, 112B, 112C, 112N. Also, users are able to unregister if they no longer want to be contacted by the registry service 106. As will be described below, a user may initiate the collaboration session by requesting a list of currently registered users. The list may be queried for particular users. From that list, registrants may be selectively sent invitations to join a collaborative session with the requesting user. Upon acceptance, registrants are automatically joined to the collaborative session, as described below.

An invitation from the registry service 106 may contain a title, description, and a universal resource locator (URL) to launch join the collaboration session when the would-be participant acknowledges the invitation. In accordance with the present disclosure, the invitation may also contain a sender ID, a message, a priority level or state (e.g., high, medium, low; in medical field this could more particularly be, e.g., stat, ASAP, critical, normal, review, second opinion, etc.), or an "accept"/"ignore selection" (this may be used in healthcare to "close the loop" to provide a confirmation that the case has been opened as opposed to just read by the recipient). The accept option provides an acknowledgement that the information associated with the invitation has been actually handed-off to the invited registrant.

The registry service 106 may store user registrations in memory or in the database 103. Invitations sent by the registry service 106 may be communicated using a server side protocol in accordance with the type of device to which invitation is being communicated. The invitations forwarded by the registry service 106 may include a title, description, and a URL.

The database 103 may store user, invitation, and receipt documents. The database 103 may also maintain availability information for each user based on calendaring information. Additionally or optionally, presence information stored in the database 103, which may be used to determine if notifications are forwarded to the user's device. Yet further, priority information (e.g., a precedence order of users to which notifications are sent) may be stored in the database 103 on a per user, per group, or global basis. The priority information may be used to send messages sequentially, with a delay between each subsequent recipient to allow for an acceptance.

Invitations may be stored such that each Invitation has a unique ID which is sent to the clients in push notifications. Clients are responsible for retrieving and decrypting the stored invitations. The clients can also delete invitations that are not longer needed. Receipts are used to track delivery of an invitation by sending the original sender special invitations that indicate delivery, acceptance, and rejection of the invitations by a specific user. All messages sent to the client are invitation notifications. The client examines the URL to know whether the invitation is a receipt.

Registration information may be stored within the database 103 in a secure fashion. As noted above, registration information may include a user's email address, full name, a client device identifier, Skype ID, Google Voice number, etc. Querying of the users may be performed using the above information or some combination thereof. The registry service 106 may also provide for 'categories' or restriction of users based on organization to allow the list of users to better scale with usage. For example, if a million users are registered with the registry service 106, the list would take a long time to download to the client computing device 112A, 112B, 112C, 112N. Adding a mechanism for partitioning the list on company, group, specialty, tags, will likely make searching and restricting the list of registered users much easier to navigate (see, FIGS. 9B-9C for examples).

The push service 107 provides for push notifications of invitations from the registry service 106 to registered user devices to join collaborative sessions. The push service 107 may be used by the registry service 106 to propagate information to the client computing devices 112A, 112B, 112C, 112N. Each client computing devices 112A, 112B, 112C, 112N may establish a connection with the push service 107 and receive notifications over this connection at the notification application 118A, 118B, 118C, 118N running thereon. As noted above, the invitation may include certain information.

Where the push service 107 is performing Apple Push Notifications, the Apple Push Notifications (ANP) encode messages may be delivered to the notification application 118A, 118B, 118C, 118N through a system of public key signed messages. The notification application 118A, 118B, 118C, 118N would receive the notifications of invitations and launch the client application 120A, 120B, 120C, 120N through a built-in URL launching mechanism.

On Android client computing devices the notification application 118A, 118B, 118C, 118N may be developed as a stand-alone application to compartmentalize the functionality. The Android operating system includes a system of Intents that allow separate applications to 'link in' to various operations the user needs to do, such as 'Viewing' and 'Sharing'. For example, in implementations in accordance with the present disclosure, the notification application 118A, 118B, 118C, 118N may be split into four parts:

1. A main application where an icon is presented to allow a user to register to be on call.
2. The G2DM receiver component that receives incoming push notifications.
3. A test message activity which sets up a VIEW action receiver for oncall:// type URLs.
4. A SendActivity which handles the Android SEND action for text/plain and text/url mime types and sends Invite messages to the server.

In accordance with the above, the notification application 118A, 118B, 118C, 118N and the client application 120A, 120B, 120C, 120N may be implemented on other client computing device platforms using a native push notification mechanism of the client computing device platform.

Thus, the framework 100 provides for a mechanism to enable users to quickly, easily and securely invite participants to collaborate in a session.

Example Operational Flow(s)

Figure 2:
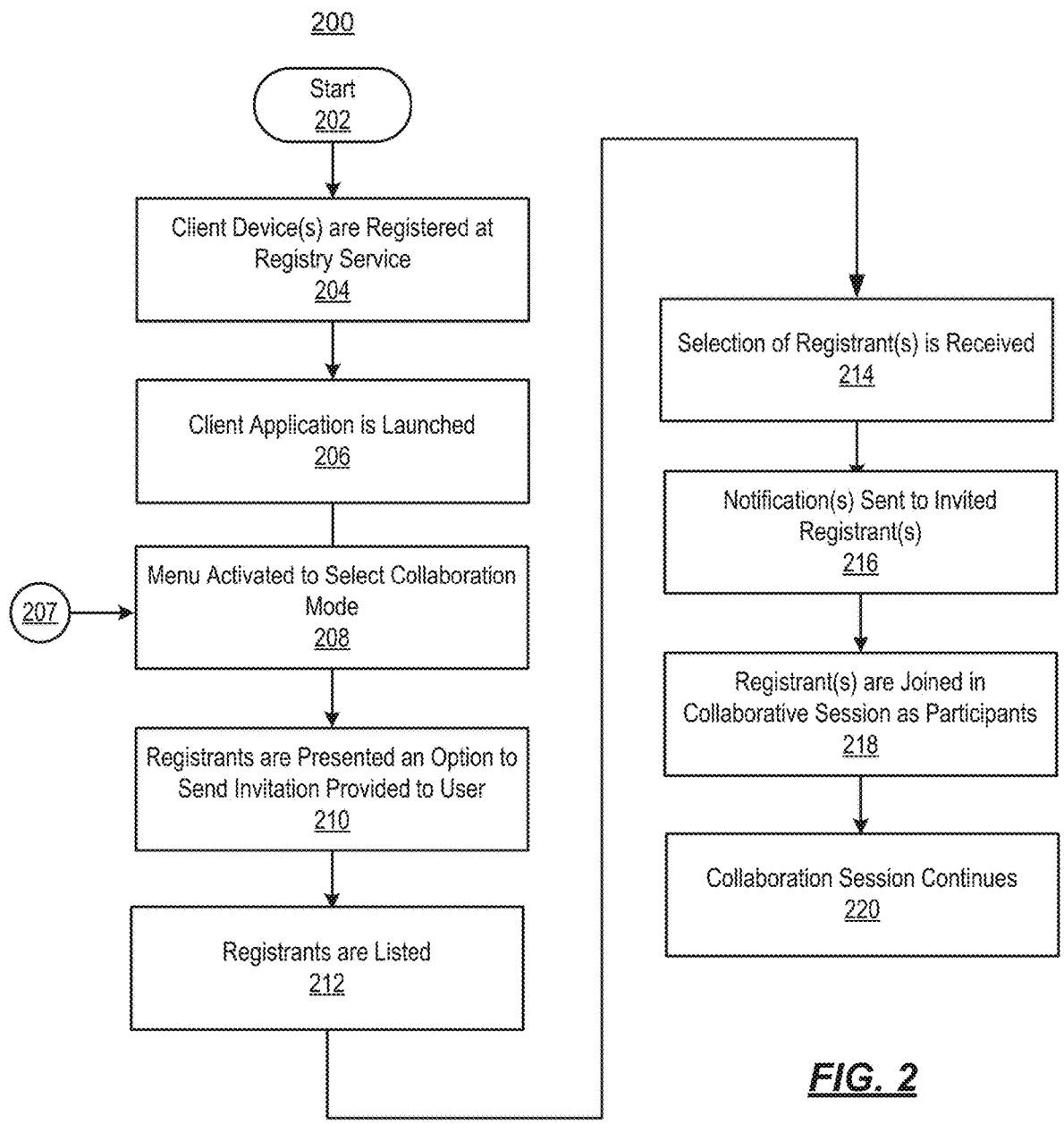
FIG. 2 illustrates an operational flow that may implemented in the framework of FIG. 1.
Figure 3:
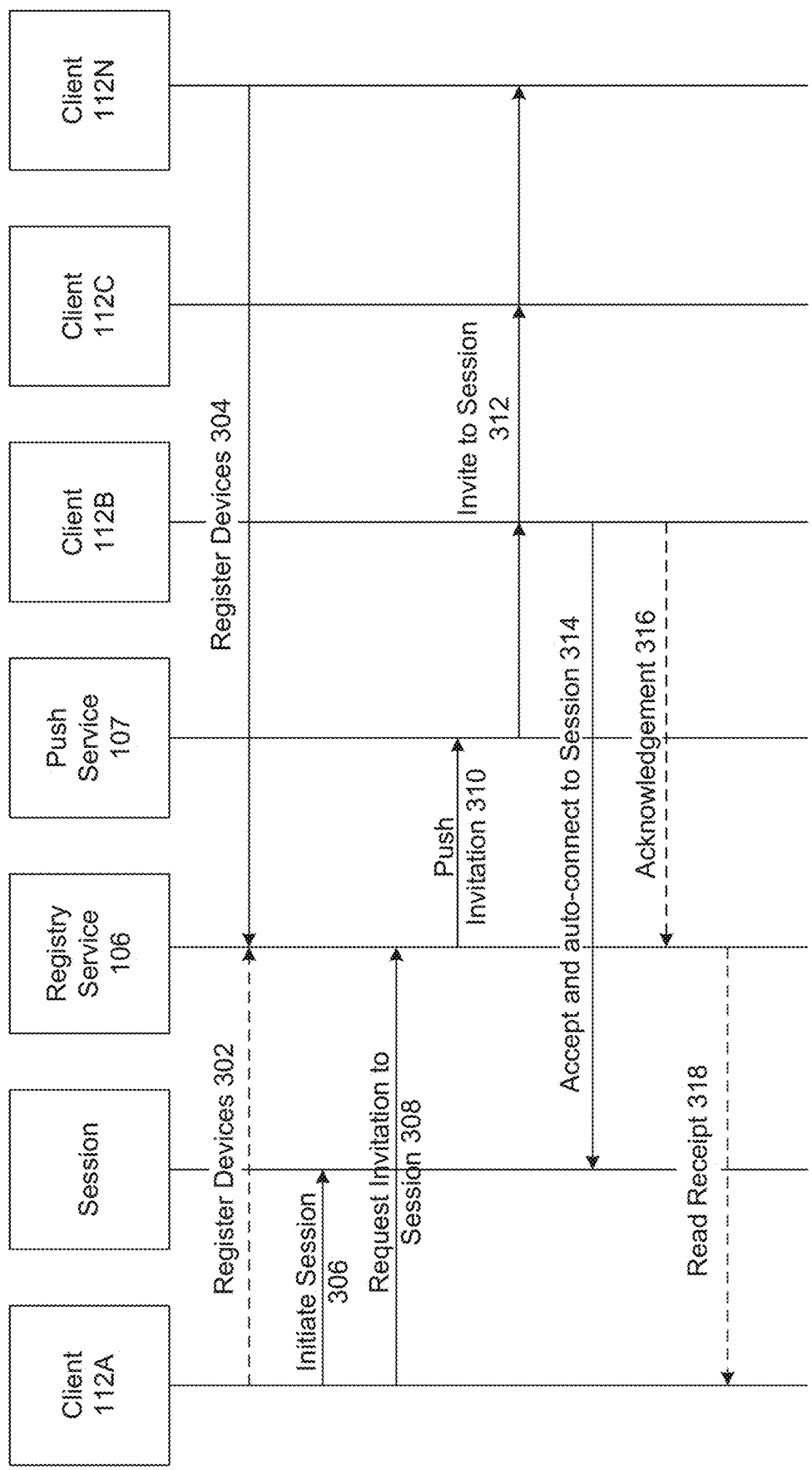
FIG. 3 illustrates a call flow diagram showing communication flows within the framework of FIG. 1.

FIG. 2 illustrates an operation flow 200 the may be implemented in the framework 100. FIG. 3 illustrates an example call flow that illustrates communication flows between the entities in FIG. 1. FIGS. 4-8, 9A-9C, 10-12, and 13A-13B illustrate example user interfaces associated with the operational flow 200 and call flow 300.

Figure 4:
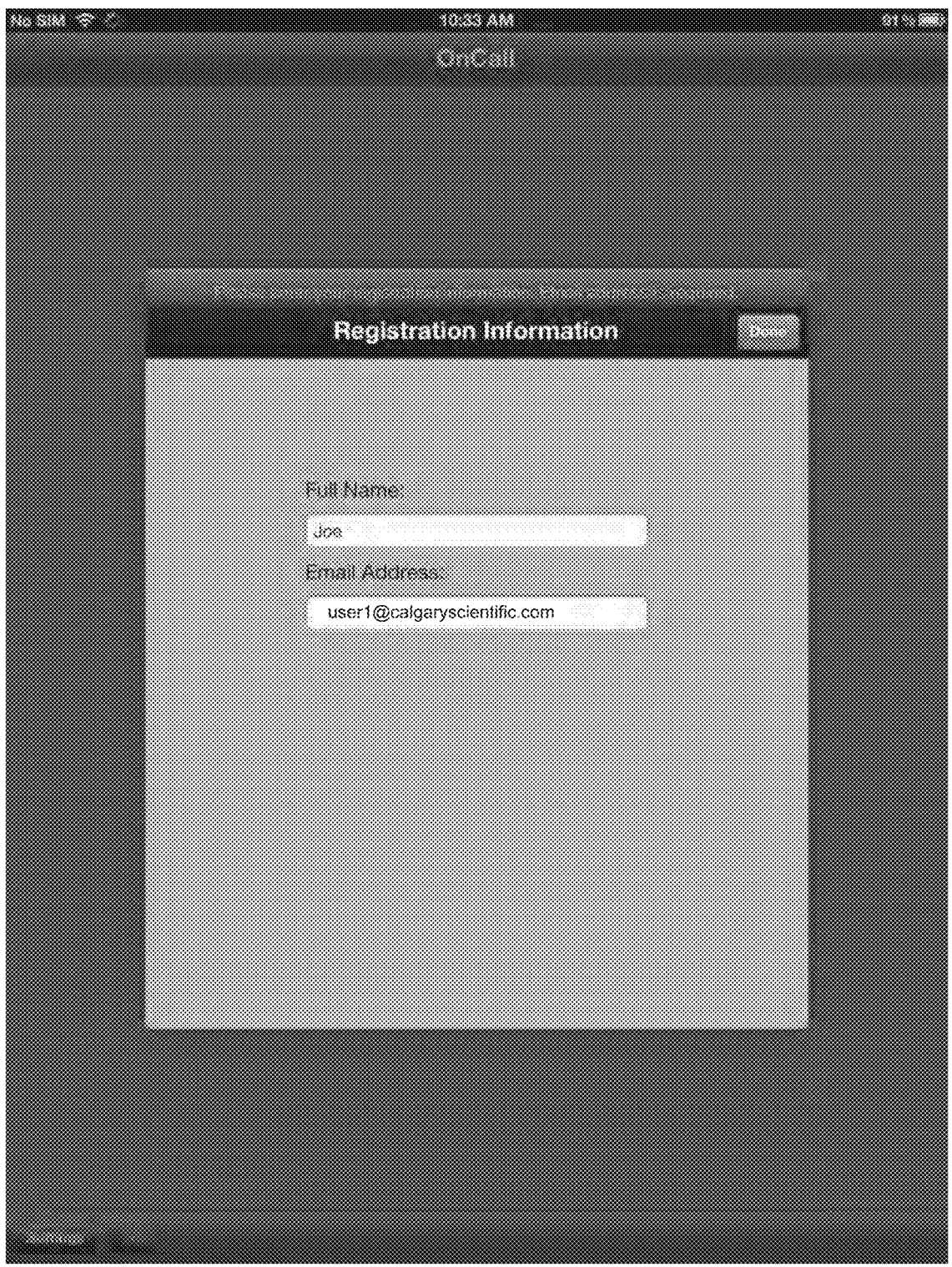
FIGS. 4-7, 8, 9A-9C, 10-12, and 13A-13B illustrate various user interfaces presented in accordance with the operational flow of FIG. 2 and call flow of FIG. 3.
Figure 5:
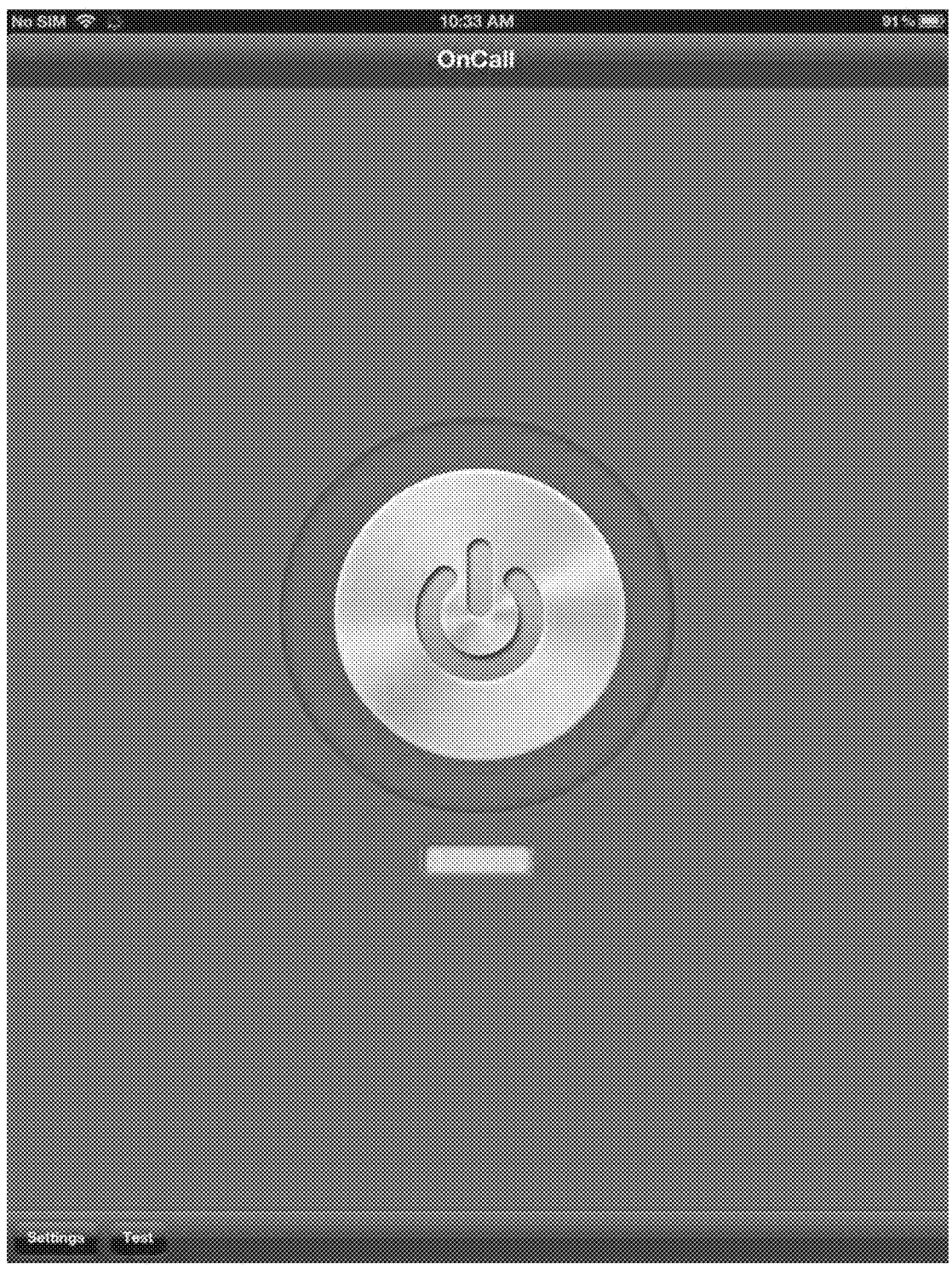
Figure 6:

At 202, the process begins, where at 204 client devices are registered at the registry service 106 as being available to join, e.g., collaborative sessions. As shown in FIG. 4, a user may launch the notification application (e.g., OnCall) 118A, 118B, 118C, 118N that requests user information, such as a full name and email address. This information is saved to the client computing device 112A, 112B, 112C, 112N. Thereafter, the notification application 118A, 118B, 118C, 118N then presents an icon to enable the user to register with the registry service 106 (flows 302 and 304). For example, as shown in FIG. 5, the user may press the button icon to register with the registry service 106. To confirm that registration was successful at 204, a confirmation message may be provided to the notification application 118A, 118B, 118C, 118N and presented to the user (FIG. 6).

At 206, the client application 120A, 120B, 120C, 120N is launched by a first user at one of the client computing devices associated with the first user. For example, a web browser may be launched as the client application 120A, 120B, 120C, 120N by the first user of the client computing device 112A, 112B, 112C, 112N. If the first user wishes to establish a collaborative session, then at 208, the user may activate a Collaboration mode using a menu (flow 306). In this work flow, the user is the "host" of the collaboration session.

In accordance with an aspect of the operational flow 200, the operations at 202-206 may be omitted and the host may begin at entry point 207. In such a scenario, the host will be an unregistered user of the notification framework 100. Here, the host may send invitations, as described below; however the host will not receive an acknowledgement of a successful acceptance of the host's invitation through the framework 100, nor will the host be able to query the database 103 for user information and status.

Figure 7:
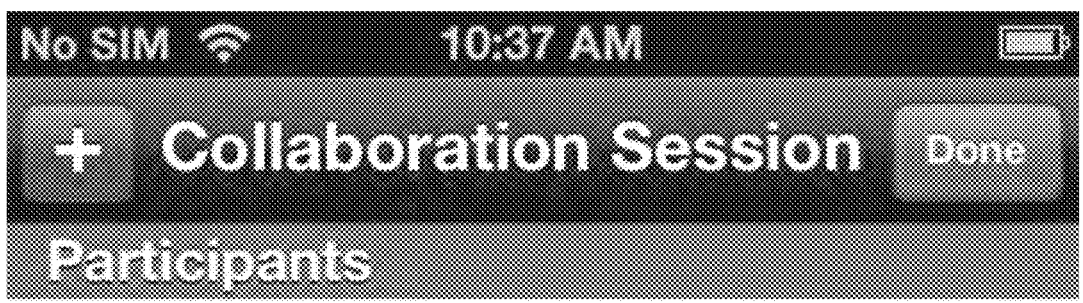
Figure 7:
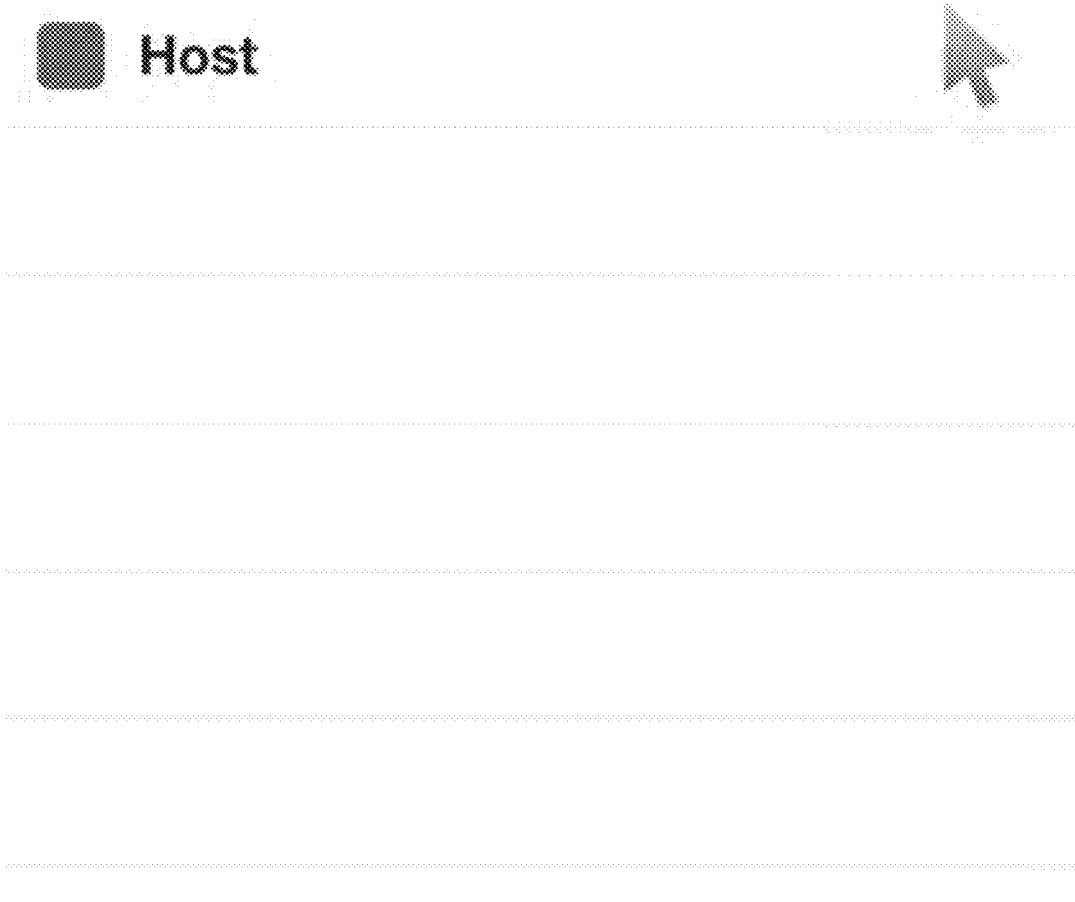
Figure 7:
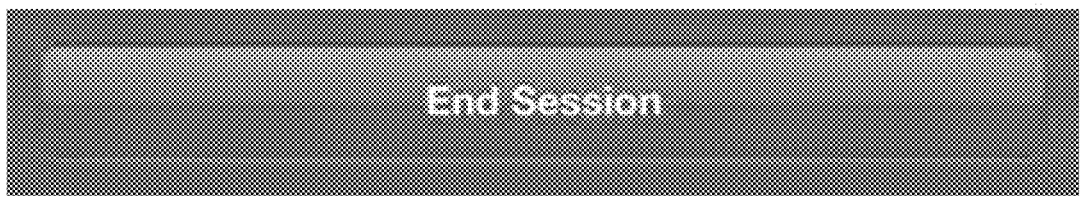
Figure 8:
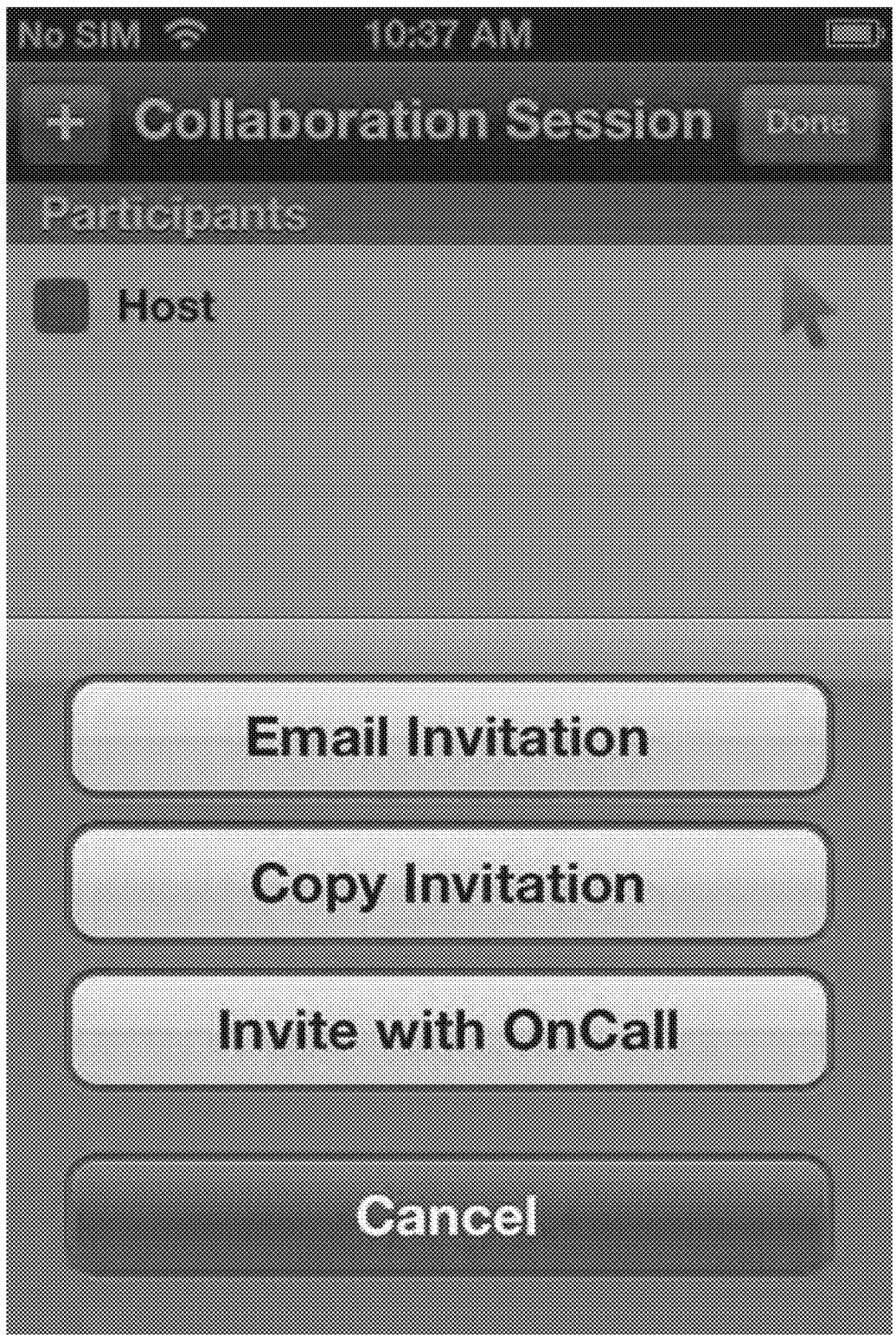

At 210, selecting the Collaboration mode then presents to the host a list of users in the collaborative session, as shown in FIG. 7. Initially, because the host is the only participant in the collaboration session, the host is the only participant shown. The host may decide to send and invitation using the framework 100 of FIG. 1 by selecting "Invite with OnCall" (FIG. 8A) or clicking an "OnCall" icon in a collaboration graphical user interface 800).

Figure 9A:
Figure 9B:
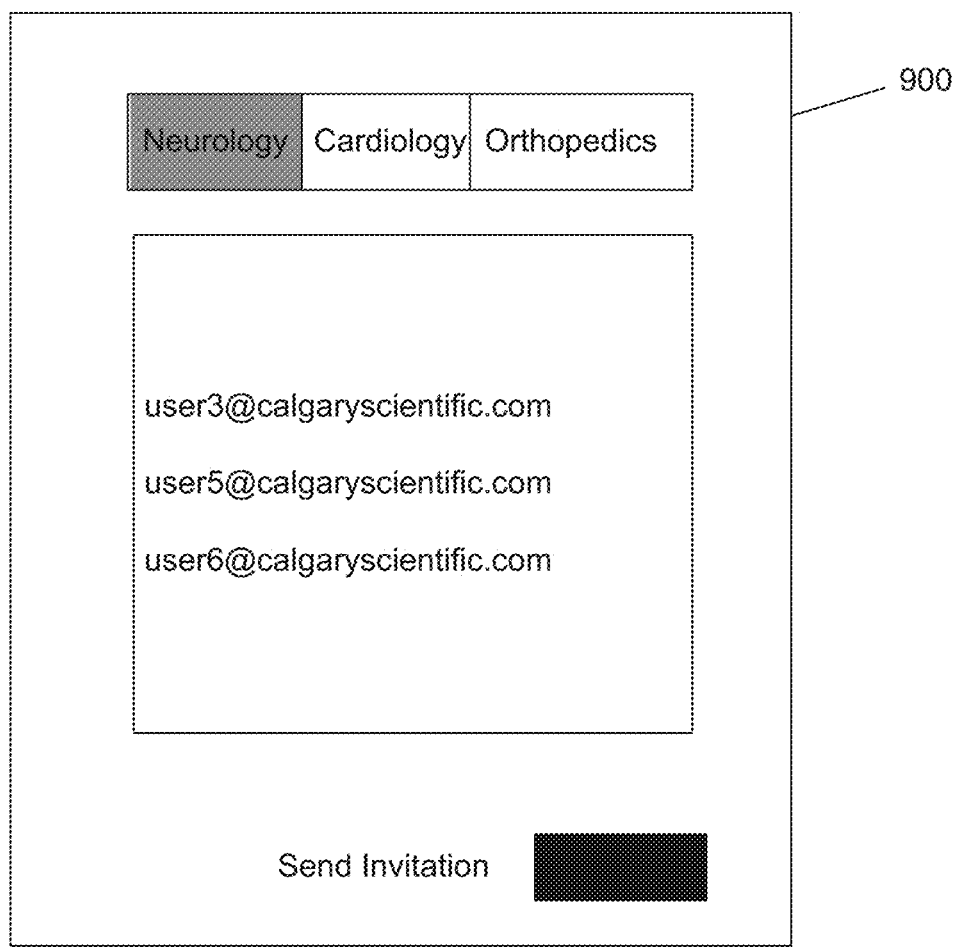
Figure 9C:
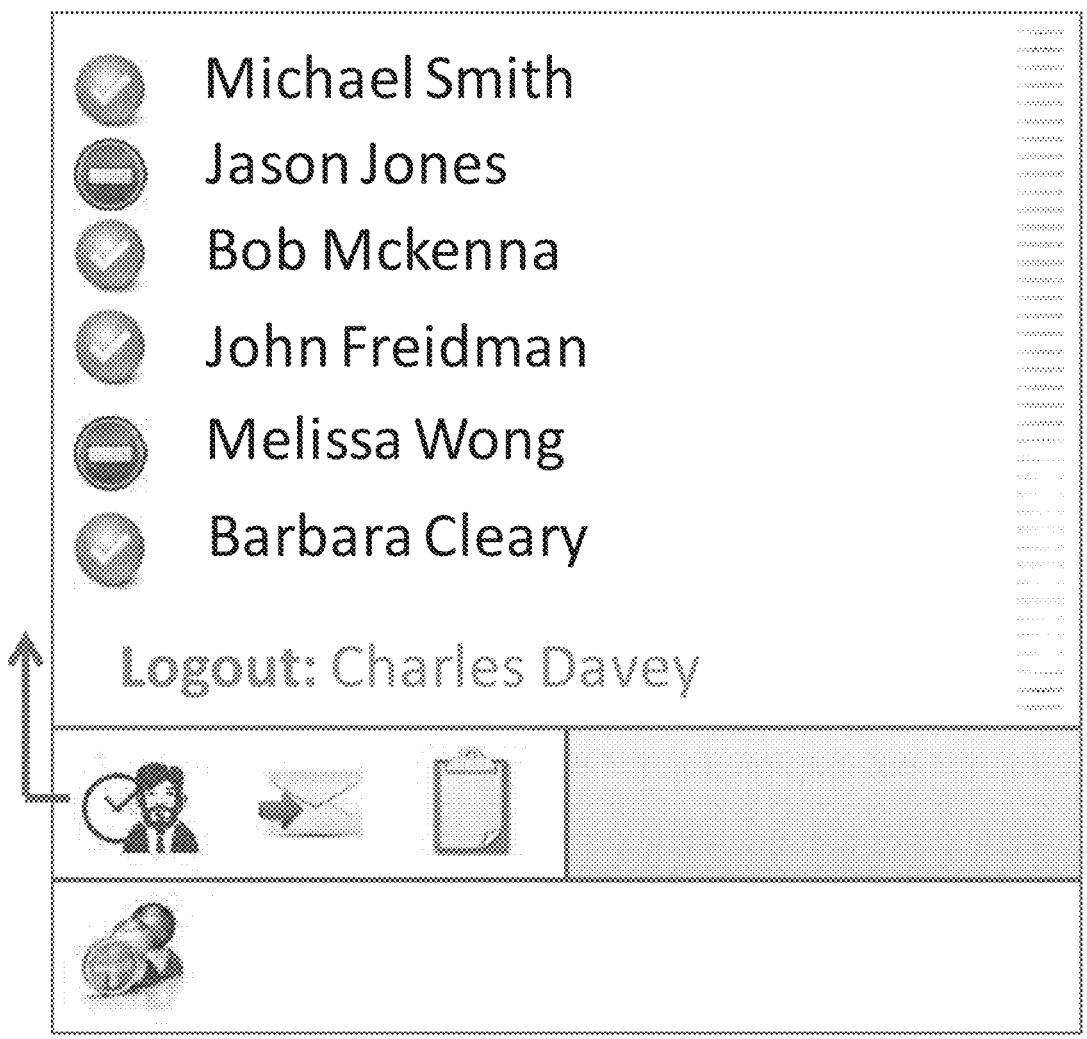

At 212, registrants are listed at the host's client computing device in response to the user selection of "Invite with OnCall" received in the user interface of FIGS. 9A-9C The registrants may be users who are available, authorized and/or qualified to attend and a collaborative session to, e.g., view medical images. The list may be presented as a simple list of users, as illustrated in FIG. 9A. As shown in FIG. 9B, the list maybe provided as groups of similarly situated users (e.g., Neurology, Cardiology, Orthopedics) and organized under a group identifier 900. As shown in FIG. 9C, additional information may be presented to a registered host regarding the status of each user, for example, whether the user is currently available or able to receive notifications.

Thus, in the above, the host may or may not be registered with the registry service 106 to activate the Collaboration mode. If the host is unregistered, the registry service 106 may be accessed using, e.g., a web browser or other client application to query the list of registrants. If the host is registered, the host may query the registry service 106 for registrants using the notification application 118A, 118B, 118C, 118N. The registry service 106 may then forward additional information with notifications to the registrants, such as but not limited to an identification of the host user in an invitation accompanying the notifications.

Figure 10:
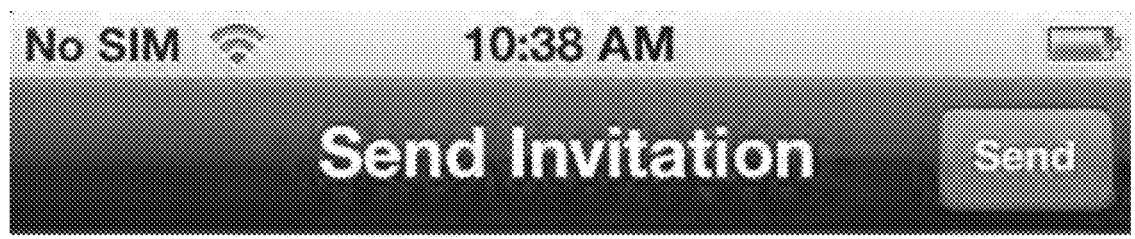
Figure 10:
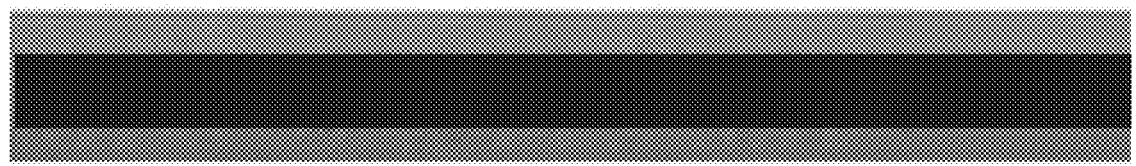
Figure 10:
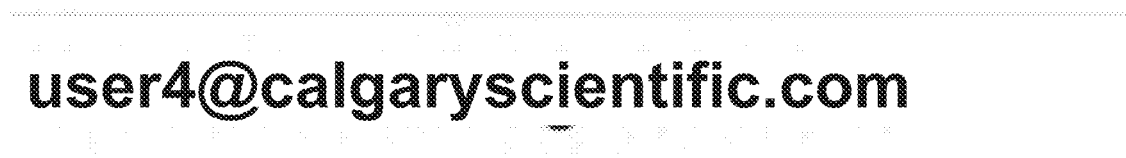
Figure 10:
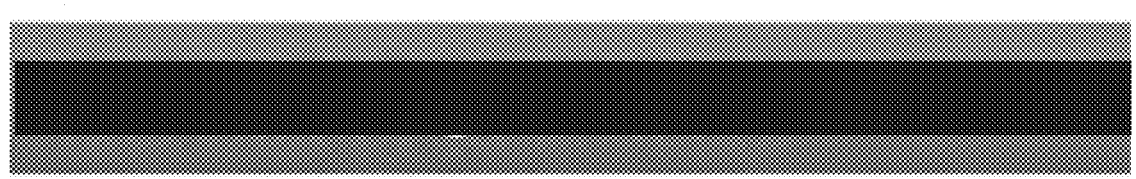
Figure 10:
Figure 11:
Figure 12:
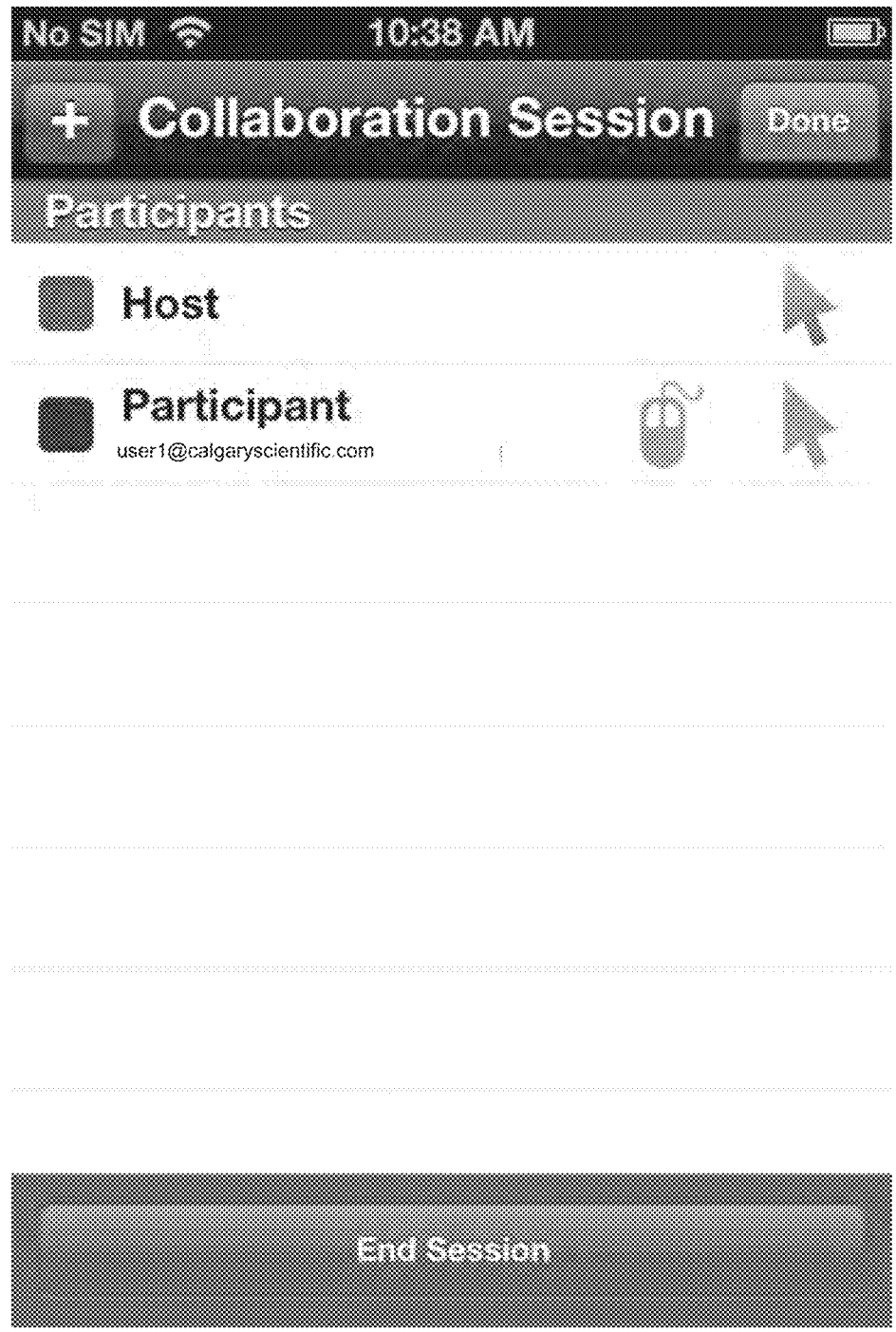

At 214, a user selection (e.g., from the host) of the registrants to be invited is received within the user interface displayed at the host's client computing device. As illustrated in FIG. 10, more than one registrant can be selected at 214. Alternatively or additionally a message may be forwarded with the invitation. The selections may be forwarded to the registry service 106 (flow 308) to enable notifications comprising an invitation and associated information (e.g., the message) to be sent to the selected registrants at 216 (flow 310). For example, as shown in FIG. 11, a notification message may be presented on the selected registrant's computing device. The notification may be received by the notification client application 118A, 118B, 118C, 118N on the registrant's computing device (flow 312).

In accordance with some implementations, invitations may be forwarded to an entire group by selecting the group identifier 900. As such, the computing devices associated with all Neurologists may receive a notification when selecting the Neurology group. Still further, notifications may be sent to predetermined or all devices associated with a user, as described below with reference to FIG. 18. For example, if a user is associated with a tablet, a mobile phone and a desktop, all three devices or a combination of the devices may receive the invitation forwarded in flow 312.

At 218, the registrants are joined in the collaborative session. If a participant accepts the notification/invitation (flow 314), then the registrant is joined automatically as a participant and, e.g., the client application 120A, 120B, 120C, 120N is launched on the participant's computing device via a URL in the invitation. Optionally, an acknowledgement may be sent from the invited registrant to the registry server 106 (flow 316) and/or a read receipt sent to the registered host (flow 318) if a message was forwarded with the invitation. The host is able to see all of the joined participants in a user interface, such as FIG. 12. If configured, all participants may be able to see the list of participants shown in FIG. 12. At 220, the collaborative session continues, as all users may be able to interact with the client application 120A, 120B, 120C, 120N.

Figure 13A:
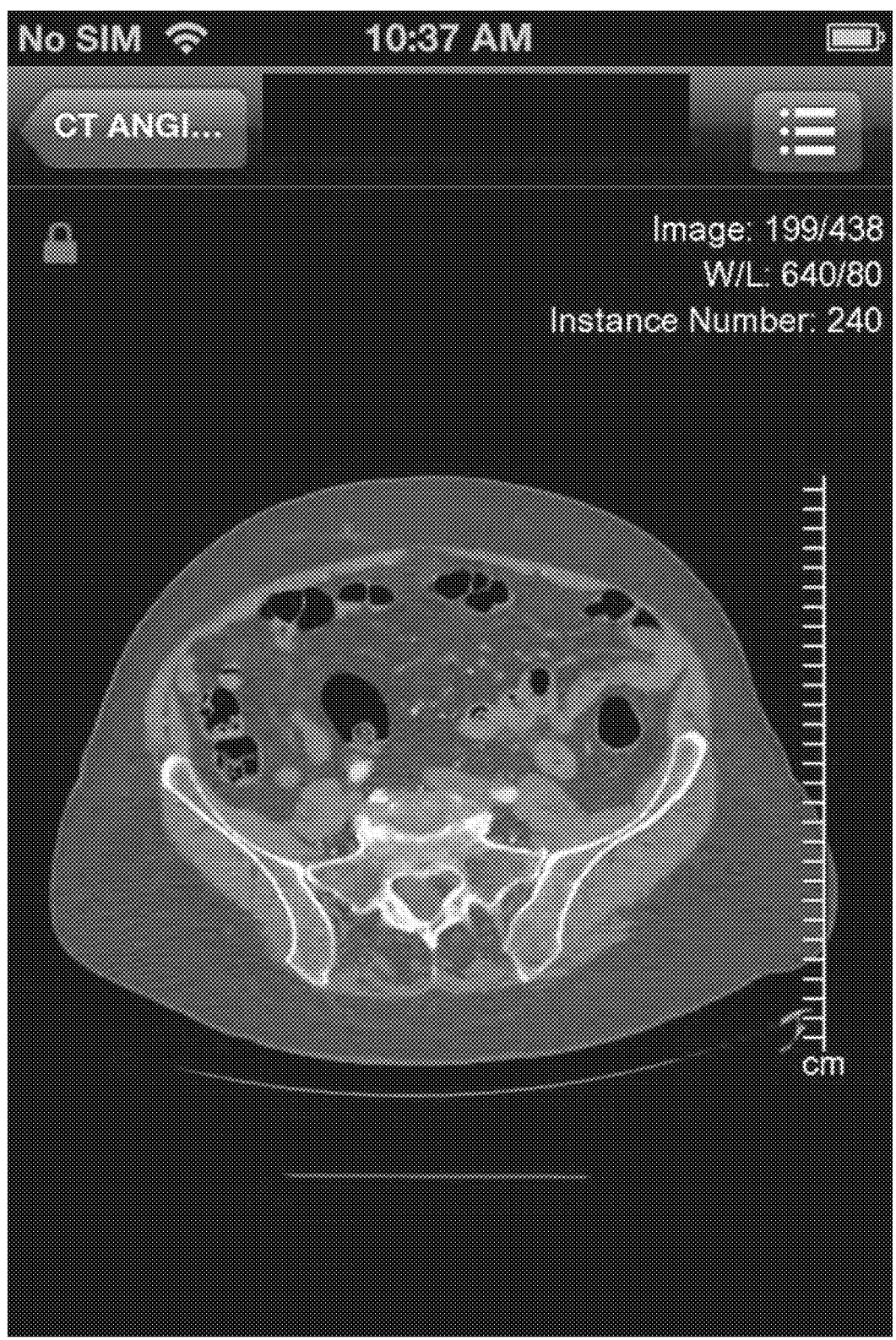
Figure 13B:
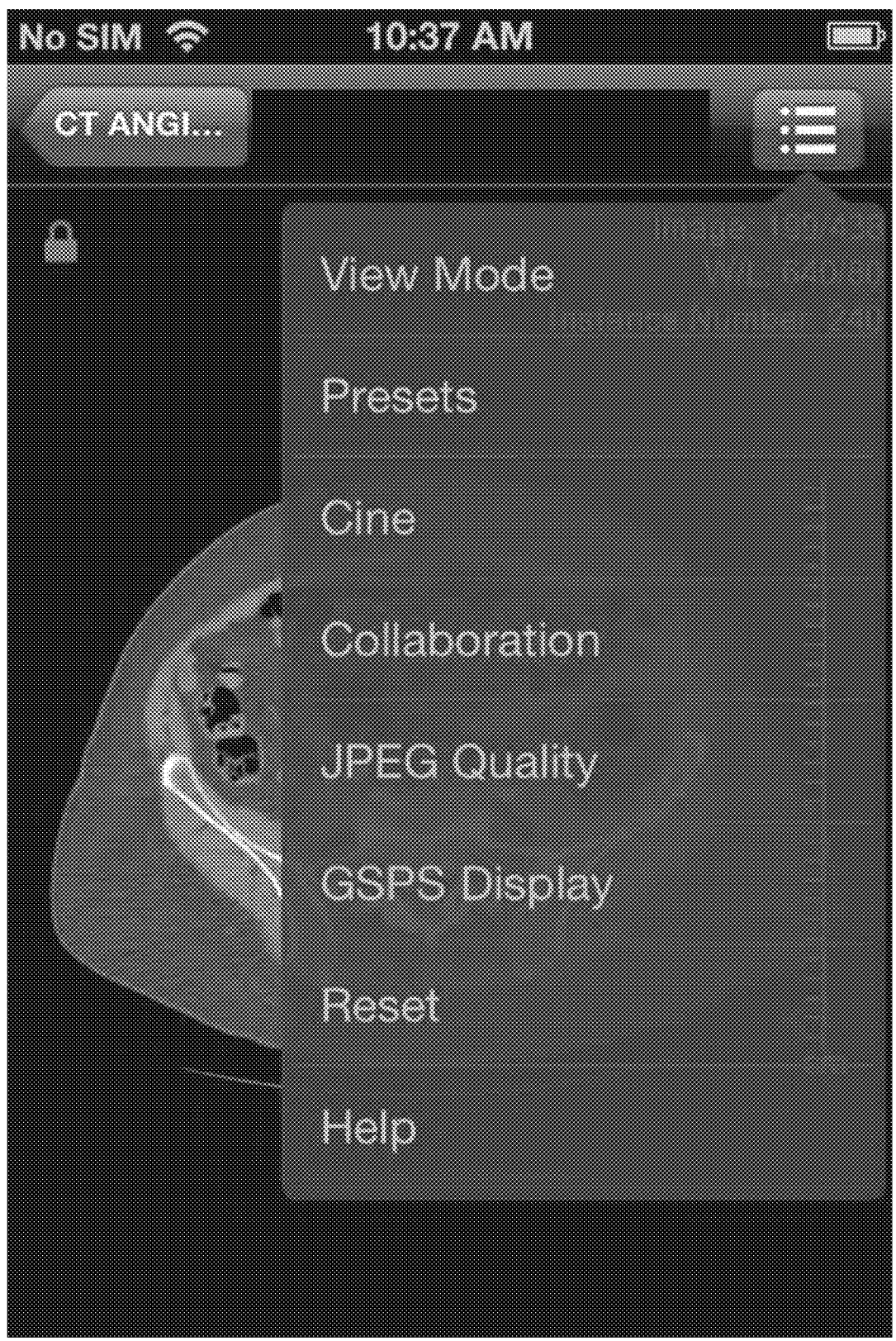

In a specific example of the operational flow 200, a host may be interacting with an image viewing application that is launched as the client application 120A, 120B, 120C, 120N, the medical imaging application may be RESOLUTIONMD, available from Calgary Scientific, Inc., Calgary, Alberta, Canada. As such, at 206, a user interface, such as FIG. 13A may be presented. From within the user interface of FIG. 13A, the user may be able to launch a collaboration session by activating a control as shown in FIG. 13B to join other users to view images using the image viewing application. For example, the collaboration control in FIG. 13B may present the user interface of FIGS. 7-9 to enable a user to select other users to invite to the collaboration session, as described above.

Optionally or additionally, the framework 100 may be incorporated into a remote access environment, such as that disclosed in U.S. patent application Ser. No. 12/592,473, entitled "METHOD AND SYSTEM FOR PROVIDING REMOTE ACCESS TO A STATE OF AN APPLICATION PROGRAM." An example of the remote access environment is PUREWEB, available from Calgary Scientific, Inc., Calgary, Alberta, Canada. An application that is remotely accessed by a client computing device may be augmented to include the notification and invitation framework 100 such that a user of the remotely accessed application can rapidly invite others to collaborate.

Figure 14:
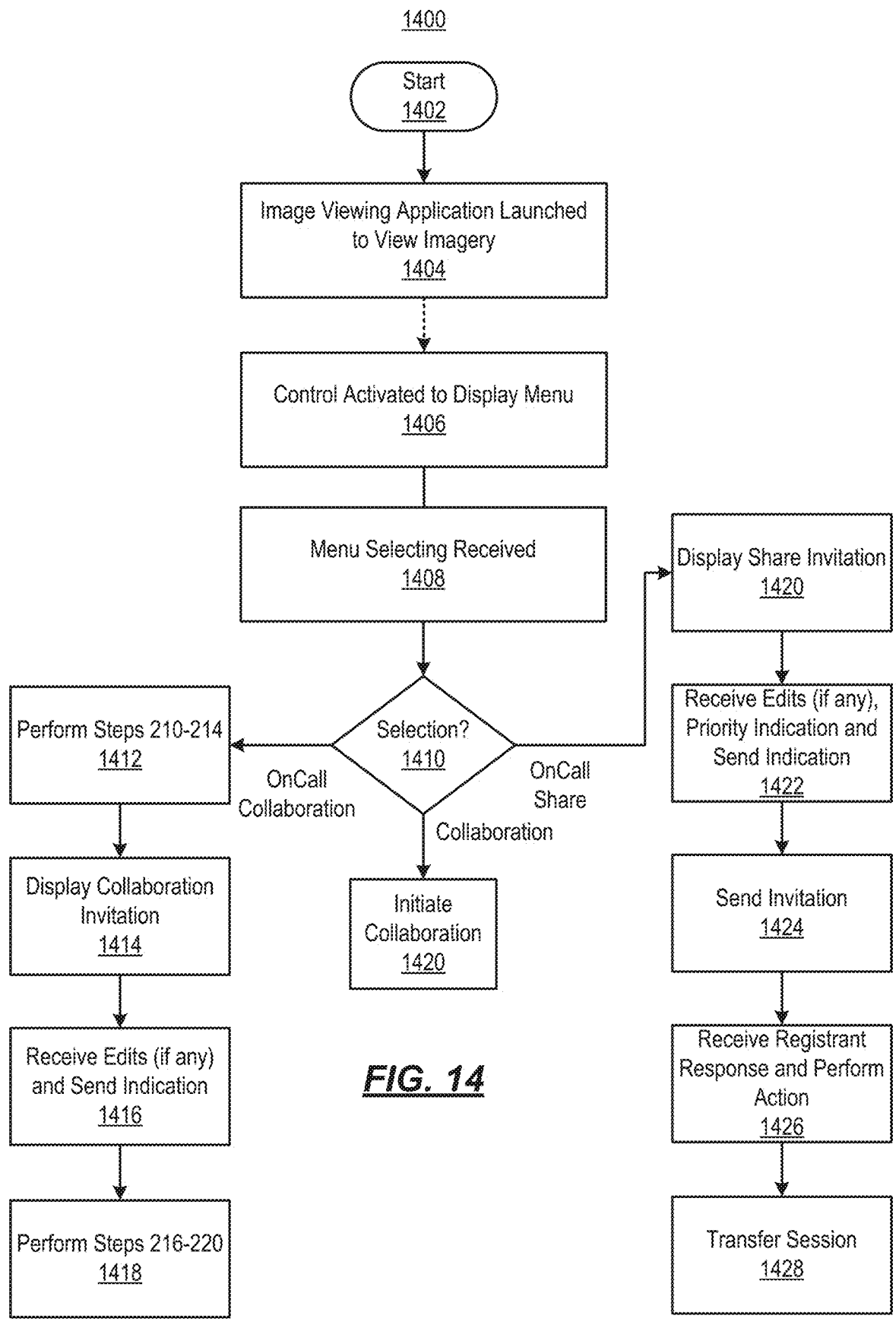
FIG. 14 illustrates another operational flow that may be implemented in the framework of FIG. 1.
Figure 15:
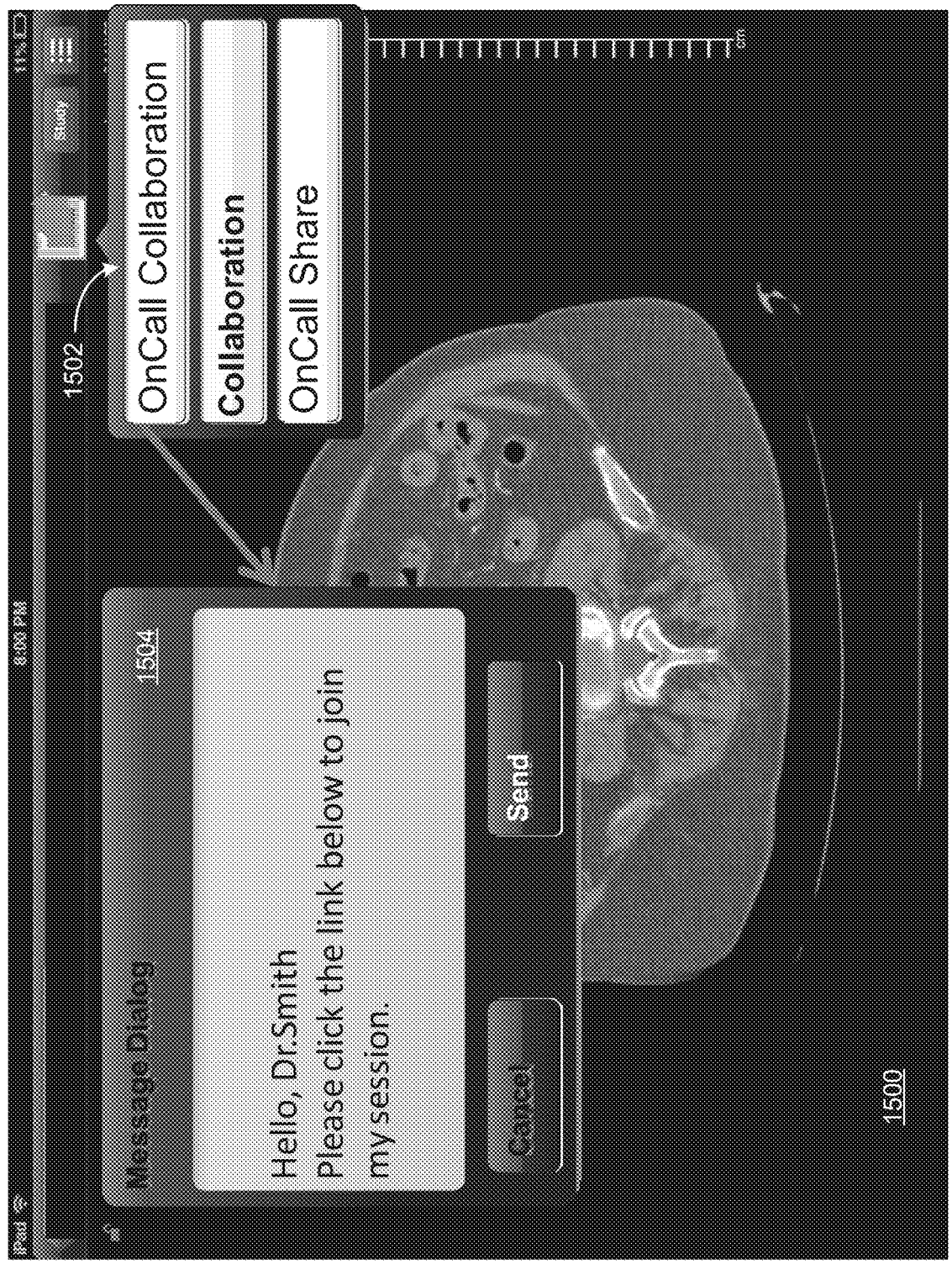
FIGS. 15-16 illustrate user interfaces associated with the operational flow of FIG. 14.

FIG. 14 illustrates another operational flow 1400 that may be implemented in the environment of FIG. 1. While the operational flow 1400 is described in the context of an image viewing application as the client application 120A, 120B, 120C, 120N, any application may be executed at the client application 120A, 120B, 120C, 120N. At 1402, the process begins where a user, at 1404, launches the image viewing application as the client application 120A, 120B, 120C, 120N to view imagery on a client computing device. A user interface 1500 (FIG. 15) may be displayed that includes a control menu 1502, which may be displayed when activated by a user at 1406. At 1408, the user may make a selection among the options presented in the control menu 1502. At 1410, it is determined which selection is received within the control menu 1502.

If the selection at 1410 is determined to be "OnCall Collaboration," then the OnCall notification client application 118A, 118B, 118C, 118N of the present disclosure is used to initiate a collaboration session. As such, steps 210-214 (FIG. 2) are performed at 1412. From within the user interface 1500, a collaboration invitation window 1504 may be presented at 1414. At 1416, the host user may enter text to be communicated as part of the invitation to the selected registrant(s) (e.g., from 214). A standard invitation message may be used to pre-populate the collaboration invitation window 1504. The host user may send the invitation by clicking the send button shown in the collaboration invitation window 1504. At 1418, steps 216-220 are performed whereby the selected registrant is joined to the collaboration session.

Figure 16:
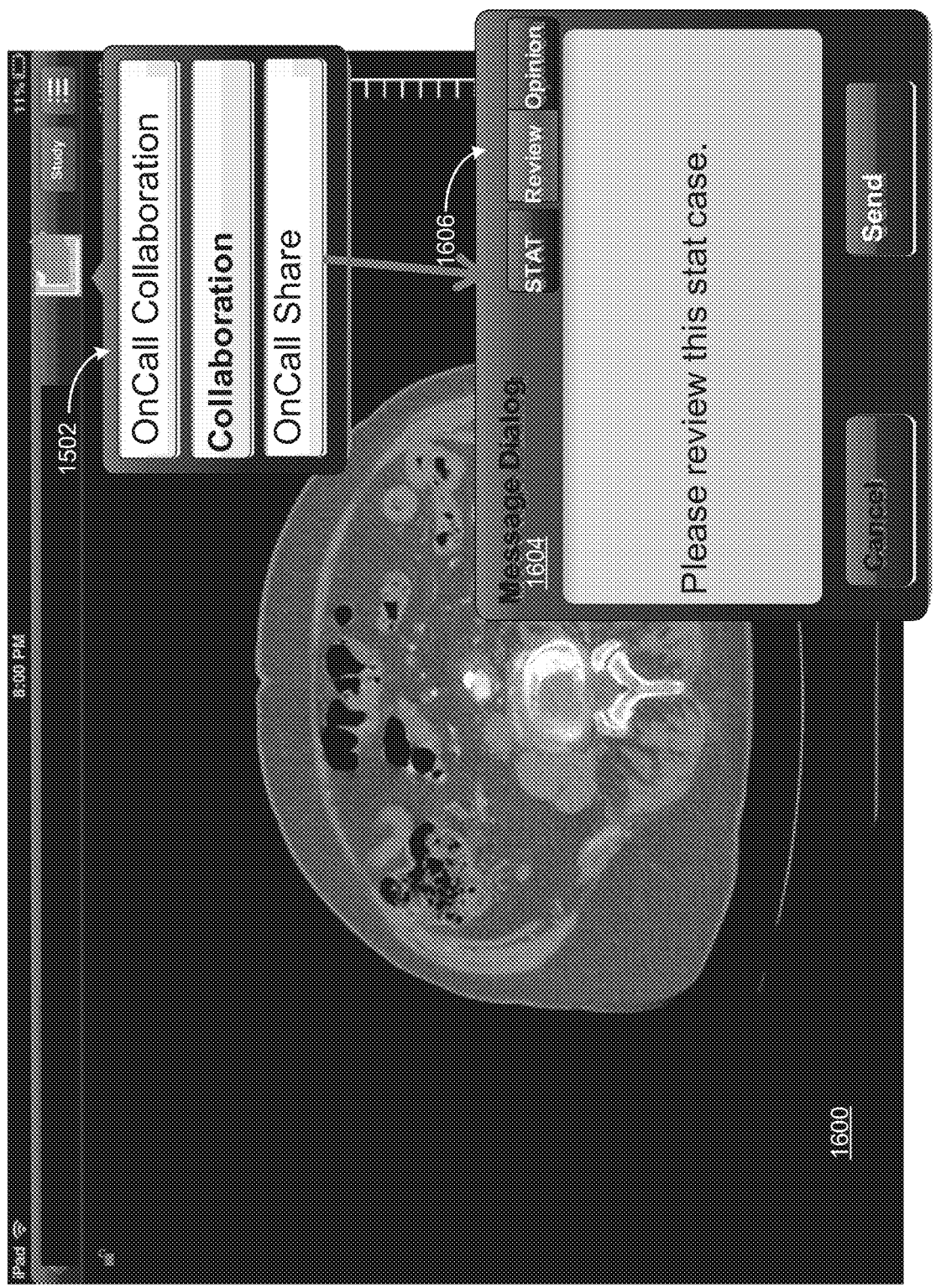

If the selection at 1410 is determined to be "OnCall Share," then the OnCall notification client application 118A, 118B, 118C, 118N of the present disclosure is used to initiate the sharing operation to pass a session to a selected registrant. A user interface such as those shown in FIG. 16 may be displayed. The user interface 1600 illustrates the control menu 1502, which may be displayed when activated by a user at 1406. At 1420, a share invitation window 1604 may be presented to the host user. For example, the share invitation window 1604 may be presented after the host user selects from a list of users presented by the registry service

106. This process may be similar to the collaboration mode of operation, described above. At 1422, the host user may enter text to be communicated as part of the invitation to the selected registrant(s). A standard invitation message may be used to pre-populate the share invitation window 1604. In addition, the host user may select a priority level or state 1606 (e.g., stat, ASAP, critical, normal, review, second opinion, etc.). The host user may send the invitation by clicking the send button shown in the share invitation window 1604. At 1424, the invitation may be forwarded to the registry service 106 to enable notifications to be sent to the selected registrant(s) at 216. The notification may be received by the notification client application 118A, 118B, 118C, 118N on the registrant's computing device. The registrant may "accept"/"ignore selection," as noted above, such that the response is received and an action performed at 1426. If the registrant accepts, then at 1428, the session transfers to the registrant.

If at 1410 the selection is "Collaboration," then collaboration maybe performed using a conventional collaboration mechanism at 1420, rather than using the framework 100 of FIG. 1.

Example Administration of the Framework 100

In addition to the above, an administrative module may be layered on top of the framework 100 to administer and control aspects of the framework 100. The administrative module may provide an interface for organizations (e.g., health care organizations, hospitals, EMRs) to load user data of the individuals (e.g., radiologists) within their organization who will be using the framework 100. Generally, organization administrators and users can log into the administrative module and specify the devices that are associated with their user account, and the precedence for receiving messages when more than one device is associated with a single user (e.g., an invitation should be sent to a user's tablet before it is sent to their phone, or sent to both simultaneously).

In an aspect, the administrative module allows an administrator of an organization to set rules by which notifications to users or groups of users are forwarded. The administrative module will allow any user to invite another user to a collaborative session. In some implementations, whether a user can send a collaboration request to another user may be determined by the administrative module. This determination will be made by a series of rules within the administrative module including (but not limited to): the current date/time, the geographical location of the user, a predetermined on call schedule for the user, or the user manually specifying their status.

The administrative module may apply rules in accordance with calendaring information stored in the database 103. Optionally, the calendaring information may be stored with a service, such as GOOGLE. Availability may be automatically turned OFF or ON in accordance with the calendaring information. The administrative module may use presence information in combination with the rules, such that when a user enters a location associated with the rules (e.g., a hospital), notifications are forwarded to the user's device. In some implementations, proximity may be used a measure of availability. For example, a user determined to be within certain areas of the hospital may be considered to be available, whereas if the user is in other areas, the user may be determined to be not available. The administrative module may also ensure the invitations to collaborate are consistent with legal rules regarding privacy, (e.g., if a user wished to share a medical image across organizational boundaries the administrative module would insure that the data was anonymized). Additional workflows may be incorporated.

Figure 17:
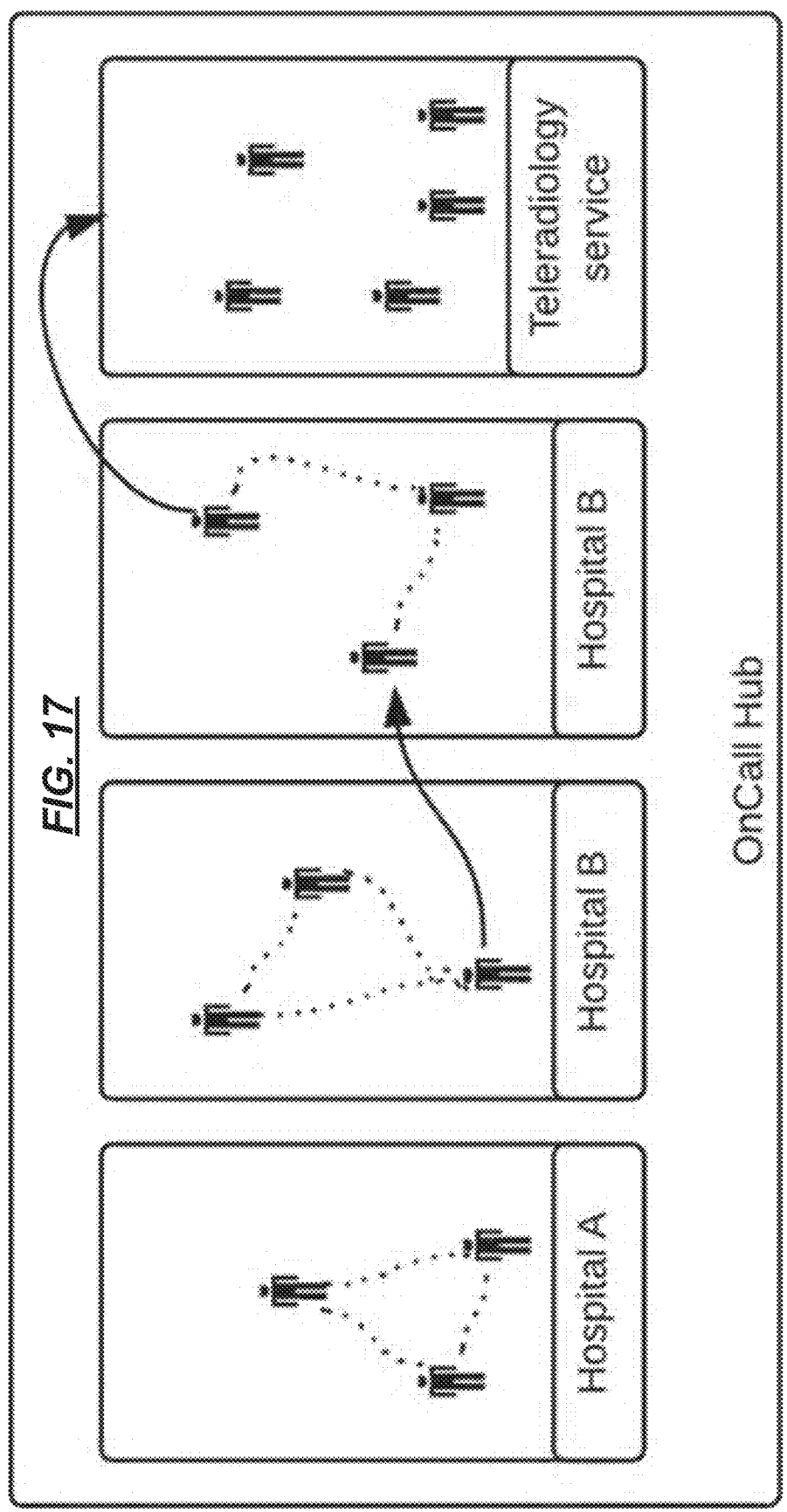
FIG. 17 illustrates a pan-organizational network in which administrative services for users of the framework of FIG. 1 may be implemented.

With reference to FIG. 17, there is illustrated a pan-organizational network in which the administrative module of the framework of FIG. 1 may be used to manage notifications. The administrative module may be used within a small organization having one class or user or one location; a large organization having several classes of users or several locations; or be pan-organizational in nature spanning different entities. In an example, healthcare related users might initiate collaboration with third party services attached to the administrative module such as a teleradiology service to get an instantaneous second opinion on a diagnosis. Further, a user can use the administrative module to be either a participant in, or the leader of a collaborative training session run by a third party radiology training service. Other use cases are contemplated.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Figure 18:
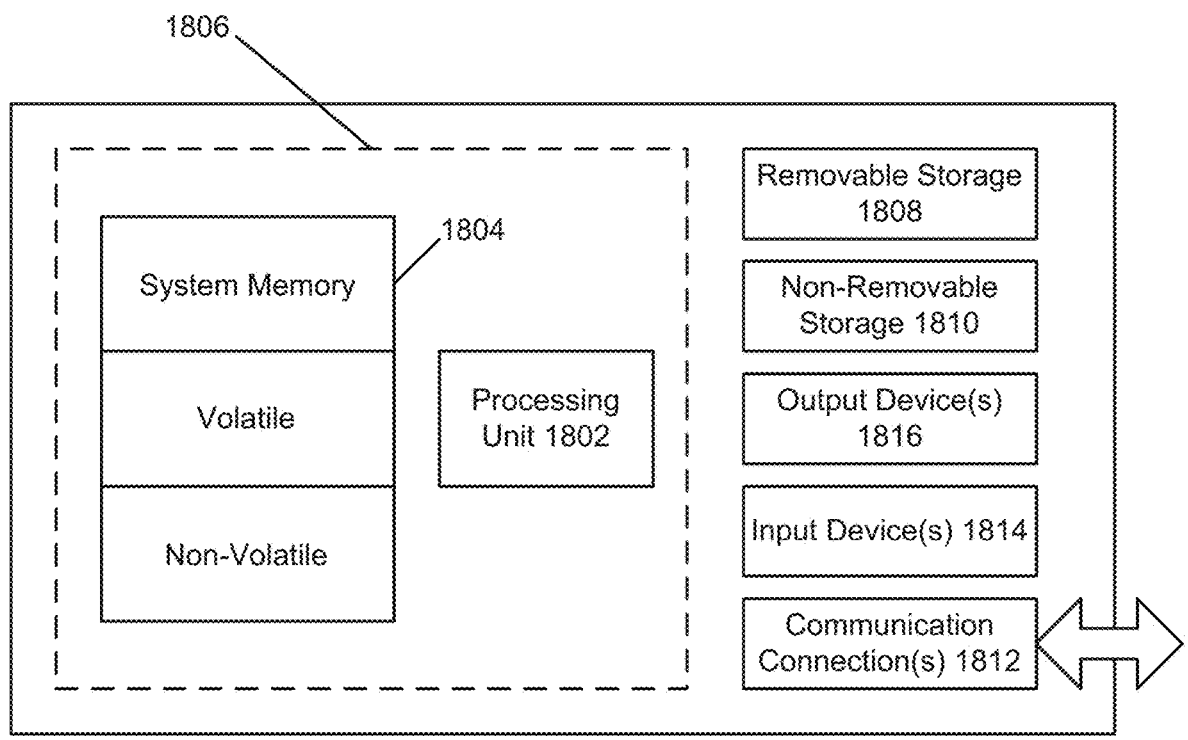
FIG. 18 illustrates an exemplary computing device.

FIG. 18 shows an exemplary computing environment in which example embodiments and aspects may be implemented. The computing system environment is only one example of a suitable computing environment and is not intended to suggest any limitation as to the scope of use or functionality.

With reference to FIG. 18, an exemplary system for implementing aspects described herein includes a computing device, such as computing device 1800. In its most basic configuration, computing device 1800 typically includes at least one processing unit 1802 and memory 1804. Depending on the exact configuration and type of computing device, memory 1804 may be volatile (such as random access memory (RAM)), non-volatile (such as read-only memory (ROM), flash memory, etc.), or some combination of the two. This most basic configuration is illustrated in FIG. 18 by dashed line 1806.

Computing device 1800 may have additional features/functionality. For example, computing device 1800 may include additional storage (removable and/or non-removable) including, but not limited to, magnetic or optical disks or tape. Such additional storage is illustrated in FIG. 18 by removable storage 1808 and non-removable storage 1810.

Computing device 1800 typically includes a variety of computer readable media. Computer readable media can be any available media that can be accessed by device 1800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1804, removable storage 1808, and non-removable storage 1810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1800. Any such computer storage media may be part of computing device 1800.

Computing device 1800 may contain communications connection(s) 1812 that allow the device to communicate with other devices. Computing device 1800 may also have input device(s) 1814 such as a keyboard, mouse, pen, voice input device, touch input device, etc. Output device(s) 1816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A notification framework embodied on a non-transitory computer readable medium executing on a computing device, comprising:
    a registry service that receives user information to register users with the notification framework, the registry service exposing availability information of registered users to other registered users of the notification framework;
    a push service that propagates collaboration invitations containing a collaboration Uniform Resource Locator (URL) to computing devices that are each associated with a particular registered user and that are communicatively connected to the notification framework; and
    a database that stores the user information and the collaboration invitations,
    wherein in response to a host user establishing a collaboration and application sharing session, a control is presented within an application user interface to invite one or more registered users of the notification framework to join the collaboration and application sharing session at a host computing device, the one or more registered users being populated into the control based on the availability and authorization information associated with the registered users provided by the registry service,
    wherein upon further activation of the control, a collaboration invitation request containing the collaboration URL is communicated by the push service from the host computing device associated with the host user to computing devices associated with the one or more registered users in order to join the computing devices to the collaboration and application sharing session, and
    wherein when the one or more registered users accept the collaboration invitation request, the notification framework automatically and dynamically joins the computing devices of accepting ones of the one or more registered users to the collaboration and application sharing session using the collaboration URL, whereby the host user and the one or more registered users show have accepted the collaboration invitation request are enabled to participate in the collaboration and application sharing session.

2. The notification framework of claim 1, wherein the collaboration invitation request includes at least one of a sender ID, a message, a priority, and an accept/ignore selection.

3. The notification framework of claim 1, further comprising a notification application that is executed on the computing device, wherein the notification application listens for the collaboration invitation request, and wherein the notification application joins the computing device to the collaboration and application sharing session.

4. The notification framework of claim 1, further comprising an administrative module, wherein rules for sending and receiving of the collaboration invitation requests within the notification framework are administered.

5. The notification framework of claim 4, wherein categories of registered users based on an organization structure are set by the administrative module and enforced by the registry service.

6. The notification framework of claim 5, wherein the registry service provides for a prioritization of registered users in accordance with the categories, the prioritization determining the one or more registered users that are populated into the control.

7. The notification framework of claim 1, wherein when additional ones of the one or more registered users accept the collaboration invitation request, the notification framework automatically and dynamically joins the additional computing devices associated with the additional ones of the one or more registered users to the collaboration and application sharing session using the collaboration URL such.

8. The notification framework of claim 1, wherein the host user is an unregistered user of the notification framework.

9. The notification framework of claim 1, wherein the availability information is determined in accordance with a readiness of the one or more registered users, an authorization of the one or more registered users to view the application to be shared in the collaboration and application sharing session, or a qualification of the one or more registered users.

10. The notification framework of claim 1, wherein a message is communicated with the collaboration invitation request.

11. The notification framework of claim 1, wherein an acknowledgement or read receipt is returned from the computing device to the host computing device after the collaboration invitation request is received at the computing device.

12. The notification framework of claim 1, wherein the application is an image viewing application.

13. A method of initiating a collaboration session at a host computing device associated with a host user of a notification framework, comprising:
    establishing a collaboration and application sharing session at the host computing device;
    presenting a control at the host computing device within an application user interface to invite one or more registered users of the notification framework to join the collaboration and application sharing session, the one or more registered users being populated into the control based on availability and authorization information associated with the registered users provided by a registry service;
    forwarding, using a push service, a collaboration invitation request containing a collaboration Uniform Resource Locator (URL) from the host computing device to computing devices associated with the one or more registered users, and
    automatically and dynamically joining the computing devices associated with the one or more registered users to the collaboration and application sharing session using the collaboration URL when the one or more registered users accept the collaboration invitation request.

14. The method of claim 13, further comprising executing a notification application on the computing device, wherein the notification application listens for the collaboration invitation request and joins the computing device to the collaboration and application sharing session.

15. The method of claim 13, further comprising executing an administrative module, wherein rules for sending and receiving of the collaboration invitation requests within the notification framework are administered.

16. The method of claim 15, further comprising setting categories of registered users based on an organization structure within the administrative module.

17. The method of claim 16, further comprising: predetermining a prioritization of registered users in accordance with the categories that is maintained by the registry service; and
    populating the one or more registered users into the control in accordance with the prioritization.

18. The method of claim 13, further comprising: automatically and dynamically joining additional computing devices to the collaboration and application sharing session using the collaboration URL as additional ones of the one or more registered users accept the collaboration invitation request.

19. The method of claim 13, further comprising: including at least one of a sender ID, a message, a priority, and an accept/ignore selection with the collaboration invitation request; and receiving an acknowledgement or read receipt from the computing device to the host computing device after the collaboration invitation request is received at the computing device.

* * * * *